UNITED STATES PATENT OFFICE 2,385,468

MONOALKYL ETHERS OF DIETHYL-STILBOESTROL

Ebenezer Emmet Reid, Baltimore, Md., assignor to Wallace & Tiernan Products, Inc., Belleville, N. J., a corporation of New Jersey No Drawing. Application June 25, 1940, Serial No. 342,267

2 Claims. (Cl. 260—613)

This invention relates to monoalkyl ethers and the method of making them. More particularly, the invention relates to medicinal compositions including the monoalkyl ethers of stilboestrol or like compounds.

The monoalkyl ethers are adapted especially for use in producing the physiological effects of a female sex hormone. The invention will be illustrated, therefore, by description of ethers characterized by oestrogenic activity.

A great deal of research has been carried out on the production of synthetic materials having properties similar to those of oestrin or theelin, a natural female sex hormone concerned in the oestrogenic cycle. There has been made and sold for this purpose, for instance, diethylstilboestrol, which is the alpha-beta-diethyl 4,4'-dihydroxystilbene. This compound when used in quantity sufficient to cause oestrus frequently produces also undesired toxic effects. Its use is accompanied or followed in many instances by nausea or headache. In fact, in one study it was found that 11 of 18 patients given diethylstilboestrol showed toxic effects; doses of 0.3 to 3.0 mg., for various periods of time, produced in 11 of the patients severe nausea and continuous vomiting, followed by complete gastric intolerance (Dodds, of the Courtaulds Research Institute, writing in Lancet, 296, 1939, I). Furthermore, it is not feasible to control the extent of the physiological effect produced by diethylstilboestrol.

It is an object of the invention to provide a material of satisfactory oestrogenic potency which does not possess the toxicity of diethylstilboestrol. Another object is to produce a composition adapted to produce oestrus for a period of time that is controllable by the dosage of the composition. These and such other objects of the invention as will appear from the detailed description that follows are secured by means of the composition and method described.

Stated briefly, my invention comprises monoalkyl ethers of dialkylstilboestrol. The invention comprises also the method of making such ethers and medicinals comprising them.

The general relationship of my new class of compounds to the dialkylstilboestrols will be evident from a consideration of formulas that may be used to represent the related compounds.

Diethylstilboestrol, for example, is commonly represented by formula (A):

(A) 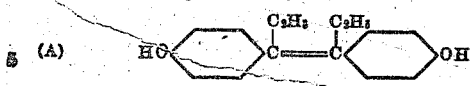

My new ethers may be represented by the type formula (B):

(B) 

In the formula (B), $R^1$ and $R^2$ represent alkyl groups and $R^3$ a monovalent hydrocarbon radical, suitably a primary alkyl group, although branched chain, secondary, cyclic, and either saturated or unsaturated alkyl groups may be used.

It will be observed that the compounds represented by the second formula differ from diethylstilboestrol in the substitution of an alkyl group ($R^3$) for the hydrogen atom of one of the hydroxyl groups. A second difference is the replacement of the ethyl groups in the alpha and beta positions in diethylstilboestrol by alkyl groups $R^1$ and $R^2$ that may or may not be the ethyl radical.

When the monoalkyl ethers of the type formula (B) are to be used to give maximum oestrogenic effect, then $R^1$ and $R^2$ should be ethyl. $R^3$ should be a short chain alkyl radical, containing say 1 to 7 carbon atoms, if it is desired to produce the oestrogenic effect with as small a dose as possible. However, this may not always be desirable and in such circumstances a longer chain alkyl group may be used in position $R^3$. Likewise, the $R^1$ and $R^2$ groups may be methyl or propyl or other alkyl if the attendant loss in oestrogenic potency is not objectionable.

It will be understood that $R^1$, $R^2$, and $R^3$ may all represent the same alkyl or different alkyls within the range of carbon atoms given above for each position of the alkyl group. Thus, $R^1$ may be methyl, $R^2$ ethyl, and $R^3$ methyl or ethyl.

In making the new series of monoalkyl ethers, the general method used is that of partial alkylation of an alpha, beta dialkylstilboestrol. More specifically, the method is one which comprises the step of replacing the hydrogen of one hydroxyl group of the dialkylstilboestrol by an alkyl group.

The alkylation of alpha, beta diethylstilboestrol is effected by heating an aqueous alcoholic solution of it containing potassium or sodium hydroxide and the halide of the selected alkyl. By using one equivalent of alkali and one of the halide, the monoalkyl ether is obtained as the predominating product. Advantage may be taken of the fact that the monoalkyl ethers are much less soluble in dilute alcoholic alkali than is alpha, beta diethylstilboestrol.

The materials are maintained in intimate contact with each other for a substantial period of time, the temperature being kept below the boiling point of the selected halide, but in any case, not higher than about 80° C. Evaporation is prevented by either closing the vessel tightly or using a reflux condenser.

As the mixture stands under the conditions described, a substantial portion of crude mono-ether separates as an undissolved product. The whole product is precipitated by the addition of water and separated, as by filtration, and repeatedly washed or extracted with aqueous solutions of alcohol and an alkali metal hydroxide of such concentrations as to dissolve very little of the monoether in proportion to the solvent power for remaining raw materials used in effecting the reaction or for undesired by-products. Finally the monoalkyl ether is dissolved in warm alcohol to give a nearly saturated solution. Any undissolved material present is separated by filtration or decantation, and the resulting solution of the monoalkyl ether is allowed to cool, to cause crystallization. The crystals so obtained may be recrystallized by repeating the operation.

In choosing the proportion of alcohol to water in the medium for the initial reaction described above or for washing and extracting the monoalkyl ether first formed, the proportion of alcohol to water is made relatively low when the radical $R^3$ is methyl or ethyl. Thus, in using methyl or ethyl halides in the above reaction, the proportion of alcohol may be approximately 1 part by volume to 2 parts of water. In making the compounds of the same type, but with halides of alkyl radicals containing 3 or more carbon atoms, the proportion of alcohol is increased more or less in proportion to the size of the alkyl group which is to be introduced into the dialkylstilboestrol. Thus, when the alkyl halide used includes an alkyl radical containing 18 carbon atoms, there is used alcohol of concentration about 94 per cent by volume. In this case the reaction is allowed to proceed for several days at approximately 40° C. or higher, after which the alcoholic medium is diluted with water to cause precipitation of the monoalkyl ether.

Detailed examples of the preparation of the monoethers are given below.

The alpha, beta dialkylstilboestrol is dissolved in alcohol, the alcohol being warmed slightly if necessary to effect solution. Water and potassium hydroxide are added, the temperature of the mixture being kept below the boiling point of the alkylhalide to be added. The alkylhalide is then added.

The compositions used in making typical products of the invention and conditions of the reaction, yields, and the properties of the end products are given in the following table. In these products $R^3$ of the type formula above is methyl, n-amyl or n-heptyl.

| Alkyl ether | Methyl | n-Amyl | n-Heptyl |
|---|---|---|---|
| Diethylstilboestrol | 1 gram | 1 gram | 1 gram. |
| Potassium hydroxide | 1 equivalent | 1 equivalent | 1 equivalent. |
| Water | 9 cc | 6 cc | 0. |
| Alcohol | 5 cc. (95%) | 8 cc. (abs.) | 23 cc. (95%). |
| Alkyl halide in excess | MeI | n-AmBr | n-HepBr. |
| Temperature, °C | 37.5 | 40–80° | 40–80°. |
| Time | 36 hours | 13 hours | 10.5 hours. |
| Yield di (crude) | 6–10% | | |
| Yield mono (crude) | 65–70% | | |
| M. P. mono | 110° | Above 77°[1] | 86.5°. |
| M. P. di | 123° | 64.8° | 49.5°. |
| Oestrogenic activity [2] | 3 gamma | About 35 gamma | About 60 gamma. |

[1] Specimen probably contained a small proportion of di-amyl ether.
[2] Weight required to produce oestrous in ovariectomized rats.

When the reaction is completed a large amount of crude mono-ether usually crystallizes out. An excess of water is now added which precipitates the balance of the products from the solution and they are separated by filtration. After drying, the filter cake is dissolved in a small amount of alcohol; one half the amount of potassium hydroxide in concentrated aqueous solution originally used is added and the mixture is allowed to cool slowly. If the correct amount of water has been used to dissolve the potassium hydroxide the di-ether formed will be insoluble in the cold dilute alcohol and will crystallize out. This is then removed by filtration. If the di-ether is present in only a small quantity or if insufficient water has been added to the potassium hydroxide, it may be necessary to add additional small quantities of water to the hot solution until a faint cloudiness indicates that the di-ether is insoluble even in the hot solution. Upon cooling the di-ether will then crystallize out, and is removed by filtration. To the filtrate further quantities of water are added which will now precipitate the mono-ether. This again is removed by filtration. From the final filtrate unreacted stilboestrol can be recovered by acidification. The crude mono-ether which is obtained as above is purified by repeated fractional crystallization using methyl and ethyl alcohol alternatively. The precipitate is sometimes of slimy consistency, particularly if it has been obtained by further dilution of the alkaline aqueous alcohol solution with water. It can be readily converted into a crystalline state if it is crystallized from pure methyl or ethyl alcohol without the addition of any alkali. To remove the remaining traces of di-ether and diethylstilboestrol, however, it has been found advantageous to repeat the original crystallization procedure. For this purpose the crystalline precipitate is dried and weighed. One equivalent of potassium hydroxide in aqueous alkali solution, calculated on the dry weight of the precipitate, is used. The whole mass is dissolved. Traces of di-ether are permitted to crystallize out, as indicated above; the mono-ether is again precipitated by dilution and the remaining stilboestrol recovered by acidification of the final filtrate. As a third solvent acetone is also useful.

The mono-ethers of alpha, beta dialkyl stilboestrol so prepared show great differences in potency from the di-ethers. In fact, the dose required of the di-ethers varies from 30 to 100 times the quantity which is adequate for the mono-ether. The di-ethers may be considered as derived from compounds of the type represented in formula B above by replacing the hydrogen of the hydroxyl group with an alkyl group.

The mono-ethers are not only potent but when administered in physiological doses do not ordinarily cause nausea and headache, which are undesirable characteristics of diethyl-stilboestrol. Furthermore, when administering the mono-ethers variation of the dose permits control of the duration of oestrus. Increased doses prolong the oestrus. This is a characteristic property of the mono-ethers. When administering diethyl-stilboestrol, a larger dose than necessary to produce oestrus only increases the undesirable manifestations of headache and nausea.

The method of testing for oestrogenic effect is that which is standard in the biological assay of the natural female sex hormones. This test is applied to a number of ovariectomized rats, guinea pigs, or mice. Rats were used by me. The selected animals were given injections of various dilutions of the composition to be assayed. The vaginal epithelium was then examined to determine the condition.

An unknown material or extract is said to contain, for instance, 1,000 rat units to the gram or cubic centimeter, if one-thousandth of a gram or of a cubic centimeter is just sufficient to produce oestrus in the ovariectomized animals, whereas half as much of the compound is not adequate to show the oestrogenic effect.

It will be understood that, in such assays, the accuracy is not as high as in an ordinary chemical analysis or physical determination. Within the customary limitations of bioassay methods, however, these values have been checked by other investigators. At any rate, it is certain that the effectiveness of the monoalkyl ethers is many times greater than that of the corresponding di-ethers and the toxicity less than that for diethylstilboestrol.

The monoalkyl ethers of the present invention may be identified in manner that will occur to one skilled in the art. If a compound is suspected to be one of the new monoalkyl ethers of dialkylstilboestrol, it may be purified and its melting point determined for comparison with the known melting points of the monoethers. If the melting point checks approximately that for a given monoalkyl ether, a second alkyl group of the same kind may be introduced and the melting point then compared with the corresponding diether. Melting points for a number of the mono- and diethers of diethylstilboestrol are given in the above table in form suitable for use for this purpose.

The introduction of the second alkyl group into the monoether, to give the diether for purposes of identification, may be made in conventional manner.

The term "diethylstilboestrol" is used herein to designate alpha,beta-diethyl 4,4'-dihydroxystilbene unless otherwise specifically stated.

It will be understood that the details given are for the purpose of illustration, not restriction, and that variations within the spirit of the invention are intended to be included in the scope of the appended claims.

What is claimed is:

1. A chemical compound of the type formula

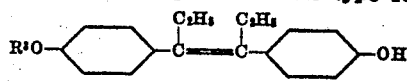

in which $R^3$ consists of the methyl radical.

2. A chemical compound of the type formula

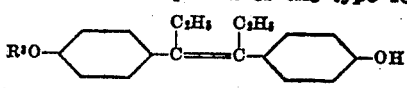

in which $R^3$ consists of an alkyl radical containing 1 to 2 carbon atoms.

EBENEZER EMMET REID.